United States Patent Office 3,402,607
Patented Sept. 24, 1968

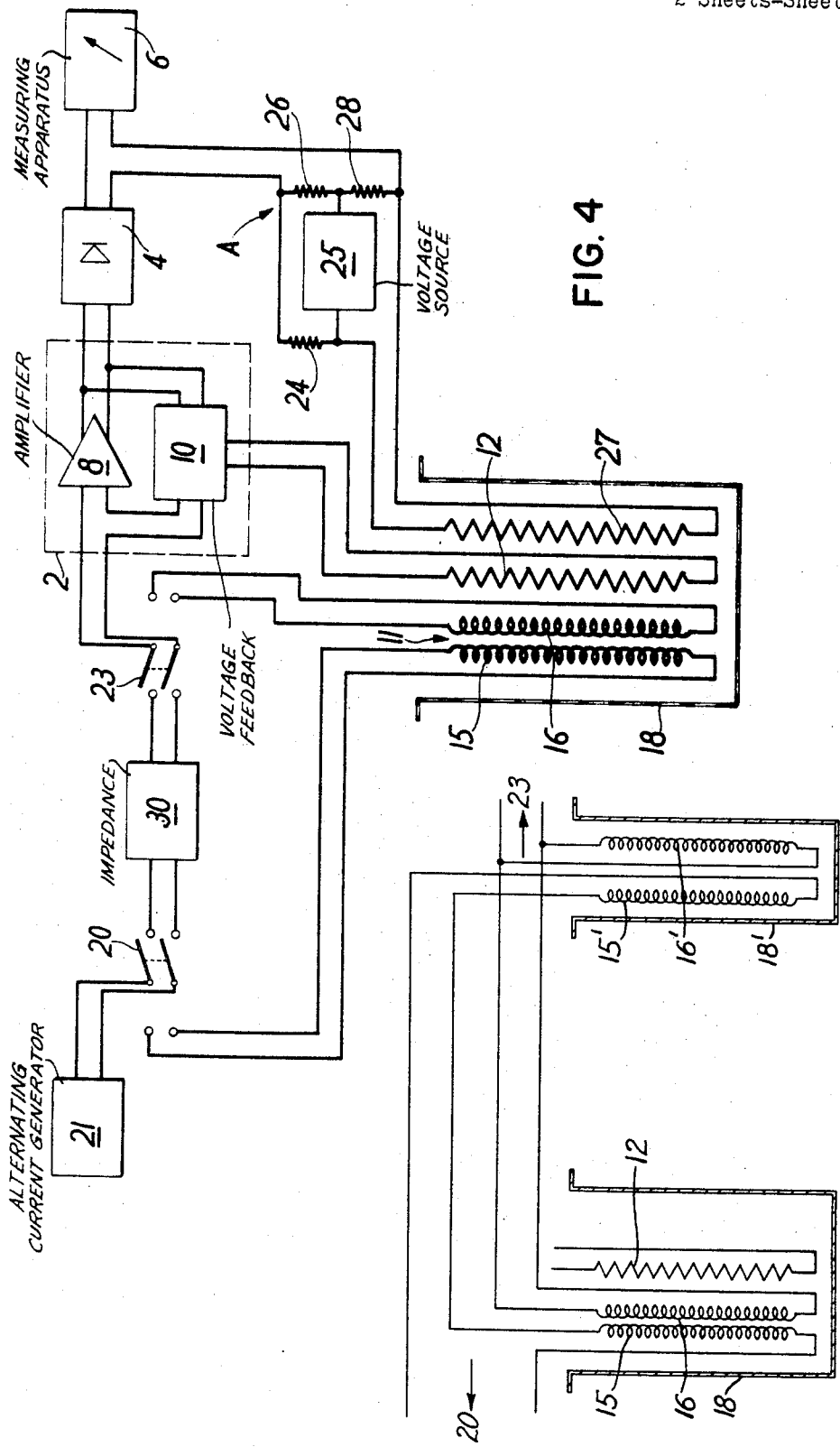

3,402,607
COUPLED INDUCTANCE LEVEL INDICATOR
FOR LIQUID METALS
Etienne Cambillard, Fontenay-aux-Roses, Jean-Paul Le Frere, L'Hay-les-Roses, Jacques Lelong, Antony, and Roger Morisset, Villiers-le-Bel, France, assignors to Commissariat à l'Energie Atomique, Paris, France
Filed Oct. 19, 1966, Ser. No. 587,797
Claims priority, application France, Nov. 4, 1965, 37,333
5 Claims. (Cl. 73—304)

ABSTRACT OF THE DISCLOSURE

A level indicator for liquid metals avoids temperature effects by using coupled inductances in which the output coil of the inductances is connected to a positive reaction amplifier or to a negative reaction amplifier so that the derivative $dU_s/dN$ of the voltage $U_s$ as supplied by the output coil of the inductances with respect to the measured height N of the liquid metal increases or decreases algebraically when the temperature rises. Compensation is provided for variation in voltage in respect to a zero level when a temperature variation occurs.

---

This invention is intended to provide compensation for temperature effects in level indicators with coupled inductances for measuring the level of liquid metals.

In the practical design of devices of this type, use is made of the electric properties of the metals employed by partially immersing in the liquid metal a probe constituted by an assembly of two coupled inductances protected by a nonmagnetic thimble so that the inductive coupling varies according to the depth to which the probe is immersed, with the result that an alternating current is fed into the input inductance whilst the output inductance delivers a voltage which is a function of the level to be determined.

The utilization of this device is attended by a number of disadvantages, as will be explained below. Some of these disadvantages have already been eliminated, with the result that errors arising from variations in resistance of the coupled inductances with temperature are easily prevented by stabilizing the supply to the probe and by making use of measuring equipment having a high impedance compared with the output impedance of the coupled inductances.

When the length of the coupled inductances is relatively substantial compared with their diameter, the output voltage $U_s$ of the probe varies practically linearly as a function of the level N of liquid metal. The system of curves $U_s = f(N)$ corresponding to different temperatures consitutes a straight-line group which is similar to that shown in FIG. 1. It can be stated that the influence of the temperature $\theta$ on the voltage $U_s$ results in a variation of the voltage $U_{so}$, when the level of the metal coincides with the bottom of the probe ($N=0$) and in a variation of the slope $dU_s/dN$ of the straight lines $U_s = f(N)$. It should be noted that the slope $dU/dN$ either increases or decreases in steepness as a function of the temperature $\theta$ according to the respective laws of variation in resistivities of the material which forms the thimble and of the liquid metal.

As a first approximation, it may be stated that the variations in ordinates in respect of a given level as well as the variations in slope $dU_s/dN$ vary linearly as a function of the temperature.

It has been proposed to compensate for variation in the voltage produced by the probe in respect of a zero level as a function of the temperature by making use of a second assembly of coupled inductances which is identical with the main assembly and brought to the same temperature as this latter but maintained outside the liquid metal. In order to produce the compensating effect, it is necessary to mount the input inductances of the two assemblies in series whilst their output inductances are mounted in opposition. The different improvements which have just been described do not permit the possibility of eliminating the variations in slope of the straight lines $U_s = f(N)$ when the temperature varies.

The device in accordance with the present invention makes it possible to eliminate all temperature effects which have just been mentioned and to dispense with the need of utlizing a second coupled-inductance assembly.

A coupled-inductance level indicator for liquid metals in accordance with the invention is characterized in that the output winding of the coupled inductances is connected to a voltage feedback amplifier, the voltage feedback being produced from an element having a resistance which varies linearly as a function of the temperature to which it is brought, followed by a rectifier which is coupled to a measuring instrument.

More specifically, it should be stated that the feedback amplifier which is employed comprises a positive feedback device or negative feedback device depending on whether the differenetial coefficient or derivative $dU_s/dN$ of the voltage $U_s$ delivered by the winding of the output inductance with respect to the measured level N of the liquid metal either increases or decreases algebraically when the temperature rises.

The invention proposes the use of an auxiliary arrangement which permits a simple compensation for variation in the voltage produced by the probe in respect to a zero level as and when a temperature variation occurs, whereupon it is merely necessary to couple the rectifier to the measuring apparatus by means of an impedance bridge which is supplied from a reference voltage source, one of the arms of said bridge which is connected to one pole of said source being constituted by a resistor which is disposed within the thimble and having a value which varies linearly with the temperature of the metal whilst the other arm of said bridge is constituted by a resistor having the same resistance as the preceding at a reference temperature to which said resistor is brought and the two arms which are connected to the other pole of said reference source are constituted by two identical resistors having a high resistance value compared with the values of the two other resistors of the bridge.

It is possible by way of alternative to employ in combination a feedback amplifier and an auxiliary assembly of coupled inductances, the use of this last-mentioned device being already known.

Aside from these main arrangements, the invention also relates to a number of different secondary arrangements which will be mentioned hereinafter and which relate in particular to one form of execution of the device according to the invention.

In order that the present invention and its different technical advantages may be more readily apparent, one form of execution will now be described with reference to the accompanying drawings, it being understood that said form of execution is given solely by way of example without implying any limitation either in the modes of execution of the invention or in the potential uses thereof.

In these drawings:

FIG. 1 as hereinabove described represents a group of curves $U_s = f(N)$ of the voltage $U_s$ produced by the probe as a function of the level N of the liquid metal in respect of different temperatures $\theta_0$, $\theta_1$, $\theta_2$ and $\theta_n$.

FIG. 4 is a general arrangement diagram of an equipment unit as constructed in accordance with the invention.

FIG. 5 is a general arrangement diagram showing a part of FIG. 4 and modified for a second auxiliary assembly of coupled inductances.

Figure 1:
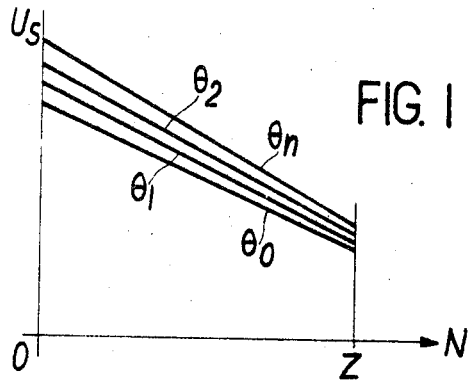
Figure 2:
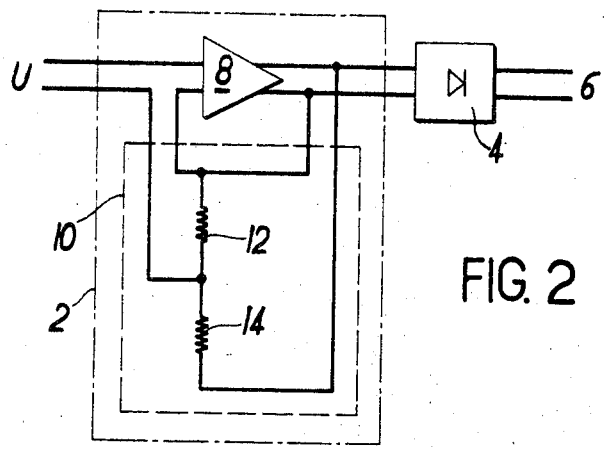
FIGS. 2 and 3 are diagrams which illustrate the use of an amplifier with either positive or negative feedback.
Figure 3:
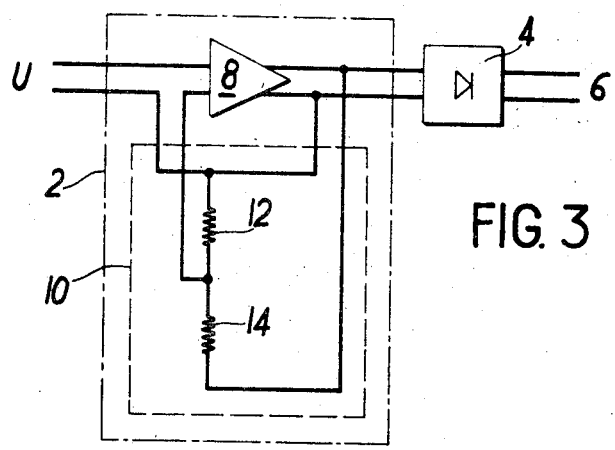

As has already been indicated in the foregoing the essential arrangement of the invention is intended to remove the disadvantages arising from variations in the slope of the curves representing the variations in the voltage $U_s$ which is produced by the output winding of the coupled-inductance unit as a function of the measured level N of the liquid metal as and when a temperature variation occurs. In order to obtain this result, said voltage $U_s$ is applied to a feedback amplifier (as shown in FIG. 2 or FIG. 3), said amplifier being in turn coupled to the detector 4 which precedes the measuring apparatus 6 (not shown).

The device 2 comprises amplifier stages 8 with which is associated a voltage feedback element 10 or 100 (FIG. 2 or FIG. 3), said feedback being produced from an element having a resistance which varies linearly as a function of the temperature which is applied thereto. It is apparent that the feedback factor must be carefully determined, taking into account the gain of the amplifier, according to the characteristics of the coupled inductances.

As a consequence, the same circuit arrangement will not be employed according as the derivative $dU_s/dN$ of the voltage U produced by the winding of the output inductance as a function of the level of liquid metal either increases or decreases when the temperature rises.

In the first case, use will be made of the arrangement shown in FIG. 2 wherein the element which produces the feedback is a resistor 12 associated in series with another resistor 14, and the unit 14–12 interconnects the output terminals of the amplifier 8. Under these conditions, whilst one of the extremities of the output element of the coupled-inductance unit is directly connected to one input terminal of the amplifier 8, the other extremity is connected to the second input terminal of said amplifier through the resistor 12, a direct connection being employed between said extremity and the common point of the resistors 14–12.

If, on the contrary, the derivative $dU_s/dN$ decreases when the temperature rises, the second extremity of the output element of the coupled inductances is connected to one of the output terminals of the amplifier 8 whereas it is the common point of the resistors 14–12 which is connected to the second input terminal of said amplifier.

FIG. 4 is a general arrangement diagram of a device in accordance with the invention for the purpose of eliminating both the variations with temperature of the derivative $dU_s/dN$ and the voltage $U_s$ in respect to a zero level of metal.

The coupled-inductance unit 11 is constituted by a winding which forms an input inductance 15 and an output winding 16, and is placed within a nonmagnetic thimble 18.

It is apparent that the above-mentioned inductances must be capable of withstanding the temperatures attained by the liquid metal, the level of which is to be measured.

It should be noted that, up to a temperature of 550° C. it is possible to make use of anodized aluminum wire which is wound on a support of insulating material.

The input inductance is connected by way of a two-position switch 20 to a stabilized alternating current generator 21 whilst the output winding 16 is connected to a feedback amplifier 2 by way of the switch 23 which is identical with the switch 20, the feedback element from which the feedback voltage is produced being a resistor 12 which is placed within the flask 18.

The unit 2–4 serves to supply a measuring voltage which is independent of the variations of the derivative $dU_s/dN$ as a function of the temperature.

In order to make said voltage independent of the variations in the voltage delivered by the winding 16 in respect of a zero level of metal as a function of the temperature, the rectifier 4 is coupled to the measuring apparatus via an impedance bridge A, one of the arms of which is constituted by a resistor 27, the value of which varies linearly as a function of the temperature and which is placed within the thimble 18. The design function of said bridge is to add (or to subtract) a voltage correcting component to (or from) that which is produced by the detector 4. Said bridge is supplied from a stabilized voltage source 25 which is connected along one of the diagonals of said bridge. The arm which is connected to the same pole of the source 25 as the resistor 27 is constituted by a resistor 24 having the same value as said resistor 27 at a reference temperature to which this latter is brought. The two arms which are connected to the other pole of the source 25 are constituted by two identical resistors 26–28 which have a high value compared with the values of the resistors 27 and 24. Whereas the point which is common to the resistors 24–26 is connected to the rectifier 4, the point which is common to the resistors 27 and 28 is connected to the measuring apparatus 6.

It will be noted that the characteristics of the resistor 27 and of the source 25 are determined according to the characteristics of the coupled-inductance unit 11 and the gain of the amplifier 2.

The condition of operation of this device can be checked by connecting the fixed impedance 30 in the place of the coupled-inductance unit 11 by means of the switches 20 and 23. Furthermore, the measuring apparatus 6 must always indicate the same value at a given fixed temperature of the resistors 12 and 20.

Different characteristics of an apparatus of a type similar to that of FIG. 4 as constructed by the present applicant will now be indicated by way of example.

The thimble 18 is fabricated of stainless steel.

The generator 25 supplies a current having a frequency of a kc./s.

It will benoted that, in accordance with one alternative form of the invention, it is possible to employ at the same time a feedback device in accordance with the invention for the purpose of compensating for the variation of slope of the curves $U_s = f(N)$ and a set of auxiliary inductances for the purposes of compensating for the variation in voltage $U_s$ in respect of a zero level of liquid metal. These auxiliary inductances are shown in FIG. 5 at 15' and 16' and are connected to the principal inductances 15 and 16. Inductances 15' and 16' are mounted in a thimble 18'. The assembly 15', 16' and 18' is maintained at the temperature of thimble 18 but is out of the liquid metal. Inductances 15 and 15' are connected in series while inductances 16 and 16' are connected in parallel. Bridge A is not used with these auxiliary inductances.

What we claim is:

1. A level indicator for liquid metal with coupled inductances contained in a nonmagnetic thimble and comprising an alternating-current voltage generator, an output inductance coupled to the input inductance at the terminals of which an output voltage (U) appears, a voltage feedback amplifier connected to said output inductance to which the output voltage (U) is applied, the feedback being produced from an element positioned within the thimble having a resistance which varies linearly as a function of the temperature which is applied thereto, a rectifier connected to the output of the amplifier which transmits the voltage produced by the amplifier to a measuring instrument.

2. A liquid metal level indicator as claimed in claim 1, wherein the feedback amplifier which is employed comprises a positive feedback device if the derivative of the voltage delivered by the output windings of the coupled inductances with respect to the measured level of the liquid metal increases when the temperature rises.

3. A liquid metal level indicator as claimed in claim 1, wherein the feedback amplifier which is employed comprises a negative feedback device if the derivative of the voltage delivered by the output winding of the coupled inductances with respect to the measured level of the liquid metal decreases when the temperature rises.

4. A liquid metal level indicator as claimed in claim 2 comprising an inductance bridge which is connected between the rectifier and the measuring instrument and which is supplied from a reference voltage source, one of the arms of said bridge which is connected to one pole of said source being constituted by a resistor placed within the nonmagnetic thimble and having a resistance value which varies linearly with the temperature of the metal whilst the other arm of said bridge is constituted by a resistor having the same value as the preceding at a reference temperature at which said resistor is maintained and the two arms which are connected to the other pole of said reference source are constituted by two identical resistors having a high resistance value compared with the values of the two other resistors of the bridge.

5. A liquid metal level indicator as claimed in claim 2 which comprises in association with the first assembly of coupled inductances a second auxiliary assembly of coupled inductances which is identical with said first assembly, the input windings of these two assemblies being associated in series whilst the output windings thereof are connected in opposition, the auxiliary assembly of inductances being brought to the same temperature as the first assembly but being maintained outside the liquid metal.

References Cited

UNITED STATES PATENTS 3,058,345    10/1962    Mastras _____ 73—304

S. CLEMENT SWISHER, *Acting Primary Examiner.*

DONALD O. WOODIEL, *Assistant Examiner.*